United States Patent [19]

Müller

[11] Patent Number: 4,625,517

[45] Date of Patent: Dec. 2, 1986

[54] THERMOACOUSTIC DEVICE

[75] Inventor: Ulrich A. Müller, Zurich, Switzerland

[73] Assignee: Sulzer Brothers Limited, Winterthur, Switzerland

[21] Appl. No.: 818,089

[22] Filed: Jan. 10, 1986

[30] Foreign Application Priority Data

Jan. 22, 1985 [CH] Switzerland .......................... 269/85

[51] Int. Cl.[4] ............................................. F03G 7/00

[52] U.S. Cl. ..................................... 60/721; 62/467

[58] Field of Search ................. 60/516, 721, 650, 682; 62/467 R

[56] References Cited

U.S. PATENT DOCUMENTS

| | | | |
|---|---|---|---|
| 2,836,033 | 5/1958 | Marrison | 60/516 |
| 3,339,635 | 9/1967 | Brandon | 62/467 X |
| 4,114,380 | 9/1978 | Ceperley | 60/721 |
| 4,355,517 | 10/1982 | Ceperley | 60/721 |
| 4,398,398 | 8/1983 | Wheatley | 60/721 |
| 4,489,553 | 12/1984 | Wheatley | 60/516 |

*Primary Examiner*—Allen M. Ostrager
*Attorney, Agent, or Firm*—Kenyon & Kenyon

[57] ABSTRACT

The thermoacoustic device is provided with rod-like elements which are disposed in the vibration chamber between the heat source and the heat sink. The rod-like elements may be in the form of wires or other elements having a circular cross-section or a convexly curved surface. The elements may be supported directly on the vibration chamber wall, between holding elements which are supported on the vibration chamber wall and in perforated holding elements secured across the vibration chamber.

19 Claims, 10 Drawing Figures

THERMOACOUSTIC DEVICE

This invention relates to a thermoacoustic device. More particularly, this invention relates to a thermoacoustic device having inserts within a vibration chamber.

Thermoacoustic devices have been known, for example as described in the dissertation of Ulrich A. Muller, "Thermoakustische Gasschwingungen: Definition und Optimierung eines Wirkungsgrades (Thermoacoutic Gas Vibrations: Definition and Optiminization of an Efficiency), Diss. ETH Nr. 7014, 1982, pages 171 to 173. As described, such devices can be constructed with a vibration chamber in which inserts are provided, for example in the form of partitions through which channels or pockets are formed. However, this known device has the disadvantage of a relatively low efficiency. According to theoretical considerations and calculations, this is attributable to the fact that the partitions which serve as the inserts are substantially flat or straight. The purpose of these partitions is to enable the build-up of a fluid boundary layer during the alternating flow of the fluid along these partitions and the heating up or cooling down of the fluid respectively.

Accordingly, it is an object of the invention to provide a thermoacoustic device having an improved efficiency.

It is another object of the invention to provide a thermoacoustic device with inserts which improve the efficiency of operation of the device.

Briefly, the invention provides a thermoacoustic device which is constructed of a vibration chamber having a heat source and a heat sink therein as well as a plurality of rod-type elements within the chamber between the heat source and the heat sink. The purpose of these rod-type elements instead of partitions is to provide an increased efficiency of the device. The reason for the increased efficiency and or power density lies in the reduced flow resistance due to much less surface area, comparing the rod type to the partition type design with the same heat exhange properties.

In order to further increase the efficiency and/or power density of the thermoacoustic device, the rod-type elements may be given a convexly curved surface.

Further, the rod-type elements may be in the form of wires. This provides an especially large number of inserts which can be accommodated in the vibration chamber.

In one embodiment, the vibration chamber can be provided with a bulge with the rod-type elements disposed within the bulge. In this case, an especially low flow resistance is obtained within the chamber. In addition, the elements can be secured directly in the wall of the vibration chamber. This results in an especially simple mounting of the elements In another embodiment, the vibration chamber is constructed with a constriction along with holding elements in the bulges to either side of the constriction for supporting the rod-type elements within the vibration chamber. This construction has the advantage that an entire bundle of rods can be mounted in the vibration chamber in a simple manner.

In another embodiment, the thermoacoustic device can be provided with perforated members which extend across the vibration chamber in order to support and hold the rod-type elements in place. In this case, the volume of the elements can be reduced. Further, in order to provide a simple mounting of the elements, each may be supported by an enlarged portion at each end which is passed through the perforated member.

In still another embodiment, one of the perforated members in which the rod-type elements are secured may be in the form of net so that the flow resistance can be further reduced.

These and other objects and advantages of the invention will become more apparent from the following detailed description taken in conjunction with the accompanying drawings wherein.

Figure 5:
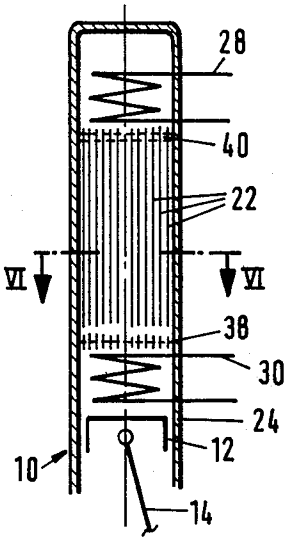
Figure 4:
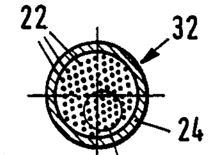
FIG. 4 illustrates a view taken on line IV—IV of FIG. 3.
Figure 4A:
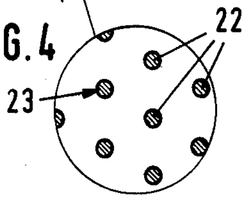
Figure 6:
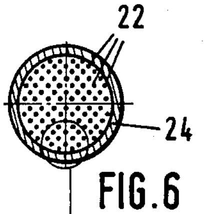
Figure 6A:
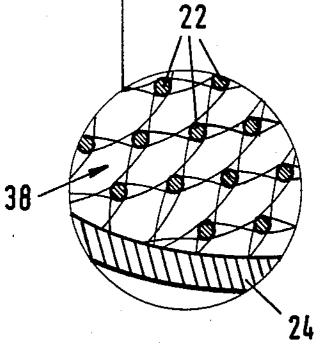
Figure 7:
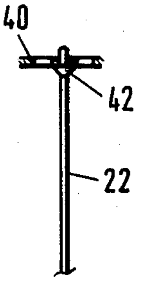
Figure 8:
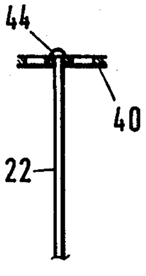

FIG. 4*a* illustrates an enlarged detail of FIG. 4;

FIG. 5 illustrates a further modified thermoacoustic device according to the invention having perforated members for supporting the rod-type elements in accordance with the invention;

FIG. 6 illustrates a view taken on line VI—VI of FIGS;

FIG. 6*a* illustrates a detail of FIG. 6;

FIG. 7 illustrates one manner of securing an end of a rod-type element in a perforated member in accordance with the invention; and FIG. 8 illustrates a modified securement of a rod-type element secured in a perforated member in accordance with the invention.

Figure 1:
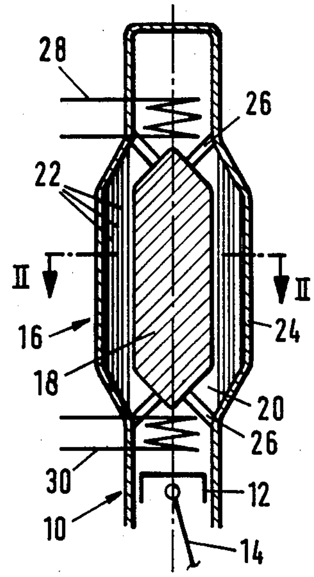
FIG. 1 illustrates a cross-section view of a thermoacoustic device constructed in accordance with the invention.
Figure 2:
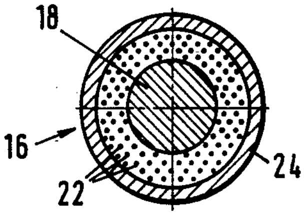
FIG. 2 illustrates a view taken on line II—II of FIG. 1.

Referring to FIGS. 1 and 2, the thermoacoustic device includes a cylinder 10 which defines a vibration chamber and in which a piston 12 is slidably mounted at a lower end, as viewed, for oscillating under the force of thermoacoustic vibrations excited within the chamber. As indicated in FIG. 1, the piston 12 is connected through a piston rod 14 with a crank drive (not shown). In addition, the cylinder 10 has an annular wall 24 which defines a bulge 16 in a central part of the cylinder 10.

As indicated in FIG. 1, a flow element 18 is supported concentrically within the bulge 16 and is secured to the cylinder 10 via a plurality of struts 26. In addition, a heat source 28 is supported in an upper part of the vibration chamber for supplying heat to the chamber while a heat sink is disposed in a lower part of the vibration chamber for withdrawing heat from the vibration chamber. During operation, as is known, thermoacoustic vibrations are excited within the vibration chamber 10 and the piston 12 is set in oscillatory motion.

Referring to FIGS. 1 and 2, an annular space is disposed between the flow element 18 and the wall 24 in which a plurality of rod-type elements 22 are secured, for example, by welding at each end directly to the wall 24. As indicated in FIG. 2, the rod-like elements 22 are disposed in a circular pattern concentrically about the flow element 18.

Figure 3:
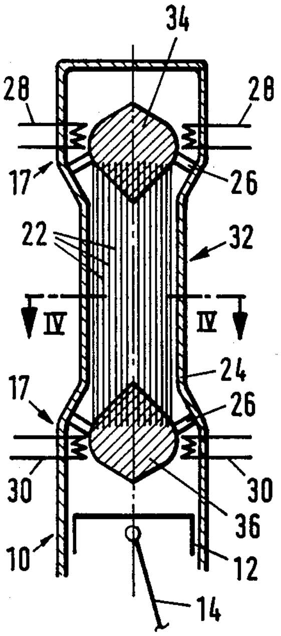
FIG. 3 illustrates a modified thermoacoustic device having a constricted vibration chamber in accordance with the invention.

Referring to FIGS. 3 and 4, wherein like reference characters indicate like parts as above, the thermoacoustic device may have a wall 24 which defines a constriction 32 between two bulges 17. In this case, holding elements 34, 36 are supported in each respective bulge 17 via struts 26 secured to the wall 24 and rod-like elements are secured at each end to the respective holding elements 34, 36.

As indicated in FIG. 3, a pair of heat sources 28 may be disposed within the upper bulge 17 while a pair of heat sinks 30 are disposed in the lower bulge 17 for the operation of the device.

Referring to FIG. 4, the rod-like elements 22 form a pattern which occupy the space within the constriction 32. In addition, as indicated in FIG. 4*a*, each element 22 has a convexly curved surface 23.

The operation of the thermoacoustic device of FIG. 3 corresponds to the operation of the thermoacoustic device of FIG. 1.

Referring to FIG. 5, wherein like reference characters indicate like parts as above, the thermoacoustic device may be provided with a pair of perforated members 38, 40 for holding the rod-like elements 22 between the heat source 28 and heat sink 30. In this case, the bottom perforated member 38 may be in the form of a net as indicated in FIG. 6*a* so as to provide for a reduction in flow resistance.

Referring to FIG. 7, each rod-like element 22 may be provided with an enlargement 42 at the upper end for abutting against the perforated member 40 while the remainder of the element 22 passes through a perforation of the member 40. The lower end of each element 22 may be constructed in similar fashion.

Alternatively, as shown in FIG. 8, each element 22 may have an enlargement in the form of a rivet head 44 at the end which abuts against the perforated member 40 from the top, and as viewed.

The invention thus provides a thermoacoustic device which utilizes inserts which provide for an increased efficiency in the operation of the thermoacoustic device. In this regard, the rod-like elements may have convexly curved surfaces to improve the efficiency of the devices. Also, the rod-like elements may be in the form of wires or any other suitable elements which have, for example, a circular cross-section.

What is claimed is:

1. A thermoacoustic device having
a vibration chamber;
a heat source within said chamber;
a heat sink within said chamber; and
a plurality of rod-type elements within said chamber between said heat source and said heat sink.

2. A thermoacoustic device as set forth in claim 1 wherein at least some of said rods have a convexly curved surface.

3. A thermoacoustic device as set forth in claim 1 wherein said elements are wires.

4. A thermoacoustic device as set forth in claim 1 wherein said chamber has a bulge therein and said elements are disposed in said bulge.

5. A thermoacoustic device as set forth in claim 4 wherein each element is secured at each end to a wall of said chamber.

6. A thermoacoustic device as set forth in claim 1 wherein said chamber has a pair of bulges and constriction therebetween and which includes a holding element supported in each bulge with said rod-type elements secured to and between said holding elements and within said constriction.

7. A thermoacoustic device as set forth in claim 1 which includes a perforated bottom extending across said chamber with said elements secured therein.

8. A thermoacoustic device as set forth in claim 7 wherein each element has an enlarged portion at one end abutted against said perforated bottom.

9. A thermoacoustic device as set forth in claim 7 wherein said perforated bottom is a net.

10. A thermoacoustic device comprising
a vibration chamber;
a heat source in said chamber for supplying heat to said chamber;
a heat sink in said chamber for withdrawing heat from said chamber; and
a plurality of rod-shaped elements extending within said chamber between said heat source and said heat sink.

11. A thermoacoustic device as set forth in claim 10 wherein said chamber has an annular wall defining a bulge between said heat sink and said heat source and each element is secured at opposite ends to said wall.

12. A thermoacoustic device as set forth in claim 10 which further comprises a flow element supported within said chamber concentrically within said elements.

13. A thermoacoustic device as set forth in claim 10 which further comprises a piston slidably mounted in said chamber for oscillating under the force of thermoacoustic vibrations excited in said chamber.

14. A thermoacoustic device as set forth in claim 10 wherein said chamber has an annular wall defining a constriction between two bulges and which further comprises a holding element in each respective bulge supporting respective ends of said rod-like elements.

15. A thermoacoustic device as set forth in claim 14 wherein each holding element is perforated and each respective end of a rod-like element passes through a respective perforation in a respective holding element.

16. A thermoacoustic device as set forth in claim 15 wherein one of said holding elements is a net.

17. A thermoacoustic device as set forth in claim 10 wherein each element has a convexly curved surface.

18. A thermoacoustic device as set forth in claim 17 wherein each element is a rod of circular cross-section.

19. A thermoacoustic device as set forth in claim 10 wherein each element is a wire.

* * * * *